(12) United States Patent
Dalla Valle

(10) Patent No.: US 6,846,552 B2
(45) Date of Patent: Jan. 25, 2005

(54) HIGHLY FLEXIBLE THIN AGGLOMERATE SHEETS OR PANELS AND PROCESS AND PLANT FOR PRODUCTION OF THE SAME

(75) Inventor: Roberto Dalla Valle, Bussolengo (IT)

(73) Assignee: Stone Italiana SRL, Verona (IT)

(*) Notice: Subject to any disclaimer, the term of this patent is extended or adjusted under 35 U.S.C. 154(b) by 283 days.

(21) Appl. No.: 10/203,857
(22) PCT Filed: Feb. 20, 2001
(86) PCT No.: PCT/IT01/00077
§ 371 (c)(1), (2), (4) Date: Oct. 8, 2002
(87) PCT Pub. No.: WO01/60590
PCT Pub. Date: Aug. 23, 2001

(65) Prior Publication Data
US 2004/0013864 A1 Jan. 22, 2004

(30) Foreign Application Priority Data
Feb. 21, 2000 (IT) .................................. VR2000A0015

(51) Int. Cl.$^7$ .................. B32B 17/06; B32B 13/04; B29B 9/00; B29B 9/08; B29C 37/02
(52) U.S. Cl. .................. 428/220; 428/426; 428/454; 264/115; 264/117; 264/120; 264/122; 264/125; 264/126; 425/112; 425/222; 425/224; 425/447
(58) Field of Search .................. 428/220, 426, 428/454; 264/115, 117, 120, 122, 125, 126; 425/112, 222, 224, 447

(56) References Cited

U.S. PATENT DOCUMENTS

| 3,222,434 A | 12/1965 | Stedman |
| 4,909,974 A | 3/1990 | Toncelli |
| 5,435,951 A | 7/1995 | Toncelli |

FOREIGN PATENT DOCUMENTS

| EP | 0 786 325 A | 7/1997 |
| WO | WO 97 36734 A | 10/1997 |

OTHER PUBLICATIONS

International Search Report dated Jul. 4, 2001 (European patent Office, Netherlands).

Primary Examiner—Stephen J. Lechert, Jr.
(74) Attorney, Agent, or Firm—Greenberg Traurig, LLP; Charles Berman, Esq.

(57) ABSTRACT

A plant (10) for the production of highly flexible and relatively thin sheets or panels (38) of agglomerate material comprising: a mixer crusher (12), a hopper (15) designed to accept the crushed and rolled material (24) and to transfer it to a distributor or spreader (16) positioned below the hopper, said spreader (16) comprising a substantially cylindrical container (30) with a loading opening (31), adjacent, in use, to said hopper (15) and comprising a discharge slot (32) on the opposite side to said opening (31), and a mixing device of the agglomerate material (24) inside said container (30). The mixing device comprises a pair of blades (35) fixed to a shaft (34) rotating around an axis not corresponding to that of said container (30) and in particular offset towards said slot (32), so that during their rotation the blades almost skim said slot.

16 Claims, 5 Drawing Sheets

HIGHLY FLEXIBLE THIN AGGLOMERATE SHEETS OR PANELS AND PROCESS AND PLANT FOR PRODUCTION OF THE SAME

TECHNICAL FIELD

This invention concerns highly flexible and relatively thin agglomerate sheets or panels.

More in particular, this invention refers to sheets or panels with a structure that allows them to be used to create floors or coverings in general without being affected by stress induced by their indeformability even for relatively extensive dimensions.

This invention also refers to a procedure for the production on industrial scale of such panels or sheets made from agglomerate material, in the case in question a material generally consisting of quartz and/or sand and/or resin binders and/or granite-based mixtures, also comprising possible intrusions of various kinds, such as metal elements, glass, wood, etc.

Finally, the invention refers to a plant for the production of panels or sheets manufactured according to the said procedure.

The invention applies mainly to the industrial processing field of quartz, granite and the like.

BACKGROUND ART

It is known that both agglomerate and natural stone materials present a certain rigidity; these materials can be used to obtain sheets or panels of a limited length and with a not excessively reduced thickness since a not perfect placing could induce cracks with consequent breakage.

For the above reasons, the thicknesses obtained must not fall below predetermined minimum values in order to prevent inevitable problems due to the rigidity of the materials.

The dimensional tolerances, relative to length, width and thickness, that can arise in the production of a traditional sheet are unfavourably high, which means that the sheets obtained can greatly differ one from the next obvious problems at the time of their use.

The background art includes a process for the production of panels or sheets made from agglomerate material consisting of for example quartz and sand and intrusions of various types (metal, glass, ceramic, wood, precious stones, etc.), or of granite, quartz or sand together with predetermined quantities of resin binders.

This process includes various processing stages, i.e.:

an initial stage in which the various materials which make up the agglomerate are crushed;

a second stage in which the crushed materials are mixed, in order to obtain a product which is as homogeneous as possible, during which the resin binders are added;

a third stage in which the agglomerate is pressed and compacted, during which the desired shape is obtained;

a fourth stage in which the panel is hardened at a predetermined temperature;

a fifth stage in which the two sides of the panel are smoothed and hardened;

a sixth stage in which the panel is cut to size, chamfered, calibrated and reamed, followed by discharge of the end products.

A procedure such as the one described above makes it possible to obtain panels or sheets made from agglomerate material with carefully predetermined lengths, widths and thicknesses, and can be carried out on a continuous basis by an appropriate plant.

A distributor or spreader is positioned between the second mixing stage and the third pressing and compacting stage to transfer the crushed material in special moulds in order to give the material a predetermined configuration before the subsequent vibration compression.

One drawback is represented by the fact that the distribution of the crushed material inside the said moulds does not always take place in an uniform way, and the presence of any fragments with a pronounced degree of granulometry can cause the formation of permanent cavities or holes in the finished product.

Document EP-A-786325 describes a method and apparatus for the production of granulated stone materials and/or sands bound with a hardenable resin. According to said method a mixture of granulated stone material and/or sand with a hardnable resins is spread on a support so as to form a layer of uniform thinkness, whereby the support is previously protected by a sheet material, and the layer in question, which is also protected on its upper surface by a similar sheet material, undergoes a vibratory compaction under vacuum and a hot hardening process.

Said method is rather complicated and economically not favourable since the application of the sheet material as lower support and upper protection can be improperly paired with negative effect during the vibration stage or the application of the vacuum.

DESCRIPTION OF THE INVENTION

The aim of this invention is to provide a plant for the production of sheets or panels of agglomerate material with extremely limited thickness, preferably between 4 and 6 mm, and at the same time with good mechanical resistance in order to offer a high degree of flexibility in their placing, limiting the risks of possible cracks.

According to another aspect, this invention aims to provide a procedure for the manufacture of these sheets and panels, limiting the risk of production waste.

According to a last aspect, this invention aims to provide panels or sheets manufactured according to the said procedure.

This is achieved by means of a plant for the production of highly flexible sheets or panels with a relatively limited thickness and with the features described in the main claim.

The dependent claims describe advantageous embodiments of the invention.

This invention also concerns a procedure for the production of sheets or blocks of agglomerate material.

This procedure is described in claim 8.

Finally, this invention concerns highly flexible sheets or panels of agglomerate material with a relatively limited thickness as described in claims 10 and 11.

The plant for the production of sheets or panels according to the invention comprises:

a mixer crusher designed to accept raw stone material and other agglomerate components in order to reduce them to a fine degree of granulometry, subsequently discharging them onto a first conveyor belt;

a series of presser cylinders deigned to level and roll the crushed material during its presence on the conveyor belt;

a hopper designed to accept the crushed and rolled material conveyed by the belt and to transfer it to a distributor or spreader positioned below the hopper, said spreader comprising:

a container with a loading opening adjacent to the hopper, a discharge slot on the opposite side, a pair of blades rotating around an axis not corresponding to the axis of the container and in particular offset towards the slot, a device for the movement of the container with respect to a fixed platform below said container, a movement device for the rotation of the pair of blades;

a fixed platform, immediately below the spreader, fitted with special moulds with no bottom, designed to receive the material discharged from said spreader;

a second conveyor belt, immediately below the fixed platform, on which the material from the moulds is received and conveyed towards a compression and compacting device;

a furnace designed to harden the agglomerate material, into which the previously compressed and compacted material is conveyed;

machine tools for finishing operations such as smoothing, polishing, cutting to size, chamfering, calibrating and reaming.

In accordance with the invention, the series of presser cylinders presents a minimum adjustable air gap for the passage of the crushed material in order to further reduce its size and to roll it.

According to a variation of this invention, an intermediate intermittent motion conveyor is positioned between the first and second conveyors, with the loading hopper for the distributor upstream of this intermediate conveyor and an accumulation tank downstream to hold the crushed material coming from the first conveyor.

The procedure for the production of sheets or panels according to the invention comprises:

a first stage in which the various materials making up the agglomerate are crushed;

a second stage in which the crushed materials are mixed, in order to obtain as homogeneous a product as possible, during which the resin binders are added;

a third stage in which the crushed and rolled material is loaded in the distribution hopper;

a fourth stage in which the crushed and rolled material is discharged from the hopper and fed into the distributor or spreader;

a fifth stage in which the distributor moves backwards and forwards over the platform moulds with simultaneous alternating mixing of the material contained in the distributor, said mixing being in the opposite direction with respect to the movement of the distributor;

a sixth stage in which the material is discharged from the distributor into the moulds on the platform, designed to give the agglomerate material a well-defined configuration;

a seventh stage in which the agglomerate material is pressed and compacted;

an eighth stage in which the panels are hardened at a predetermined temperature.

In accordance with the invention, the crushed material is levelled and rolled between the second and third stages; furthermore, the rotary mixing of the crushed agglomerate material inside the distributor takes place by moving this material mostly in correspondence with the discharge slot of the said distributor.

Thanks to these measures it is possible to obtain sheets or panels with extremely limited thicknesses, preferably between 4 and 8 mm.

Experiments carried out by the applicant have produced excellent results with thicknesses of around 4–6 mm.

DESCRIPTION OF THE DRAWINGS

Other features and advantages of the invention will become evident on reading the following description of one embodiment of the invention, given as a non-binding example, with the help of the enclosed drawings, in which.

DESCRIPTION OF ONE EMBODIMENT

Figure 1:
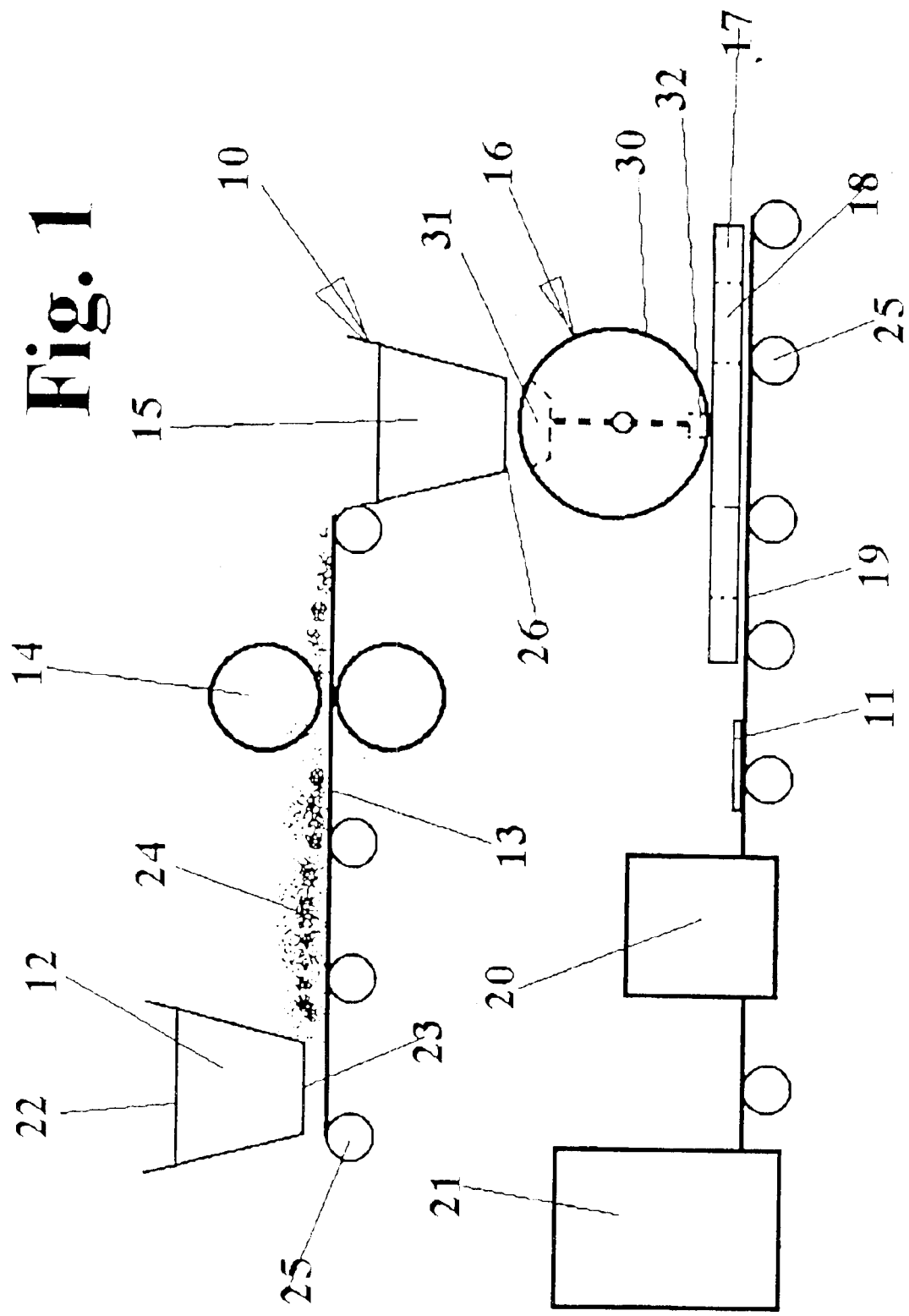
FIG. 1 shows a front elevation of a plant according to the invention.

In the figures, the reference number 10 generally indicates a plant for the production of sheets or panels, in the case in question a plant 10 for the production of highly flexible sheets 11 of agglomerate material with a relatively limited thickness.

This plant comprises:

a crusher mixer 12, a first belt conveyor 13, a series of presser cylinders 14 acting on the conveyor belt 13 downstream of the mixer 12, a collection hopper 15, a distributor or spreader 16 below the hopper 15, a fixed platform 17, immediately below the spreader 16, fitted with special moulds 18 with no bottom, a second conveyor belt 19, immediately below the fixed platform 17, a compressing and compacting device 20;

a furnace 21, machine tools (not shown in the drawings) for any finishing operations such as smoothing, polishing, cutting to size, chamfering, calibrating and reaming.

The mixer 12 normally comprises a casing to contain any appropriate crushing device, for example screws or augers, a loading opening 22, for the insertion of the agglomerate material in large pieces together with other powders such as colorants and resin binders, and a discharge opening 23 for the exit of the crushed and mixed material 24 which is deposited on the first conveyor belt 13.

The latter is guided and driven by appropriate rollers 25 and passes between at least one pair of presser cylinders 14 whose reciprocal distance is relatively limited in relation to the granulometry of the material 24.

The rotation direction of each cylinder 14 is concordant with the movement of the belt 13 so that the crushed material 24 is levelled and rolled.

The end section of the first conveyor 13 is adjacent to the hopper 15 into which the material 24 is transferred.

This hopper 15 discharges the material 24 into the distributor 16 below it.

The material is discharged into the distributor in predetermined amounts, the hopper 15 being particularly capacious and having a discharge opening 26 with an intermittently functioning closing device.

Figure 2:
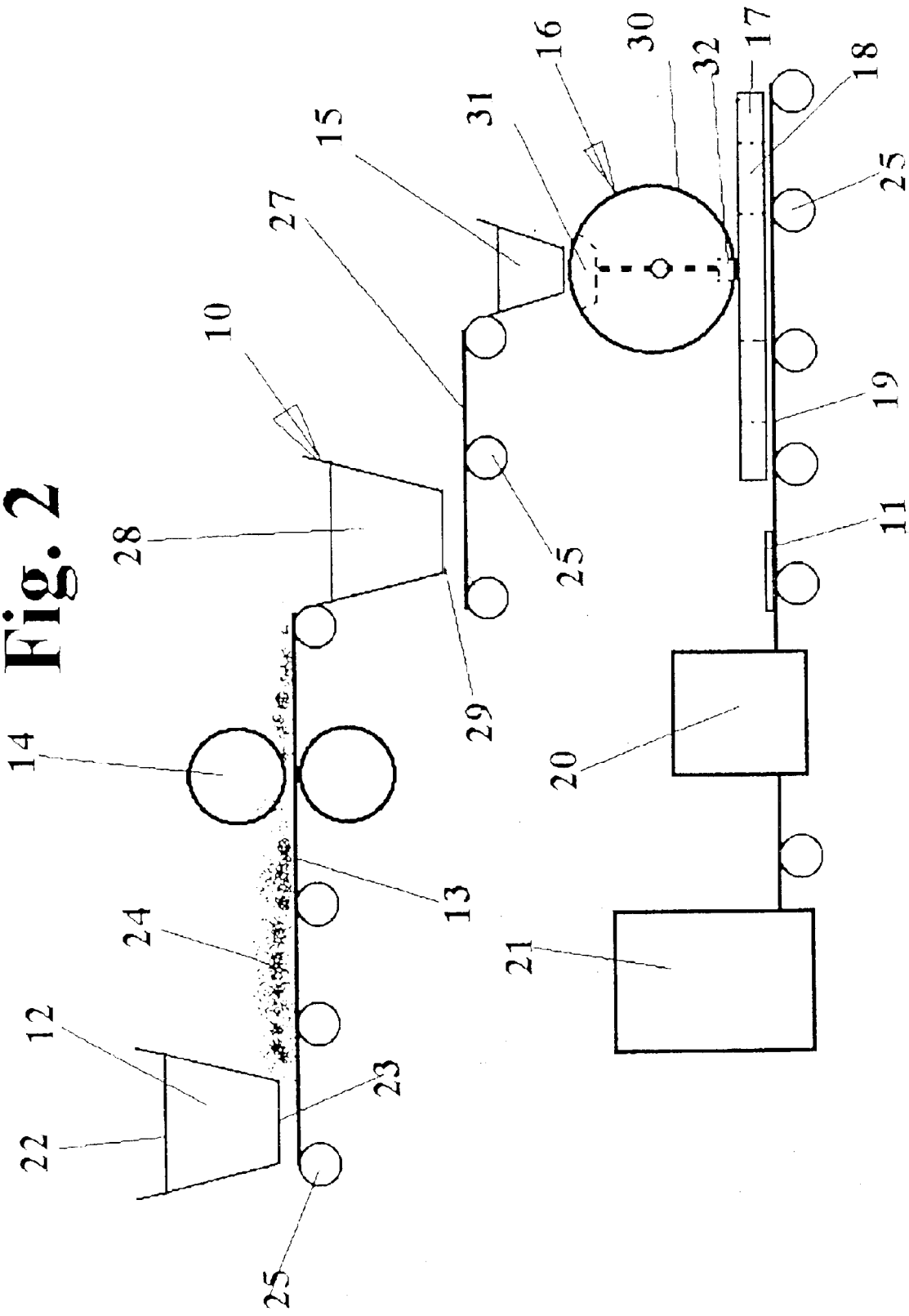
FIG. 2 represents a front elevation of a variation of the plant in FIG. 1.

With reference to FIG. 2, an embodiment variation can be seen which foresees the interposition, between the first conveyor 13 and the second conveyor 19, of an intermittent motion intermediate conveyor 27 upstream of which is the loading hopper 15 for the distributor 16 while downstream of this intermediate conveyor 27 is an accumulation tank 28 for the crushed material 24 discharged from the first conveyor 13.

In this case, the tank 28 has a discharge opening 29 facing the intermediate conveyor 27 fitted with an intermittent closing device, while it is not essential for the opening 26 of the hopper 15 to be fitted with such a device.

The hopper 15 can be kinematically connected to any appropriate source of motion designed to move it longitudinally with respect to the distributor 16 so as to feed the distributor uniformly with the crushed and rolled material 24.

Figure 3:
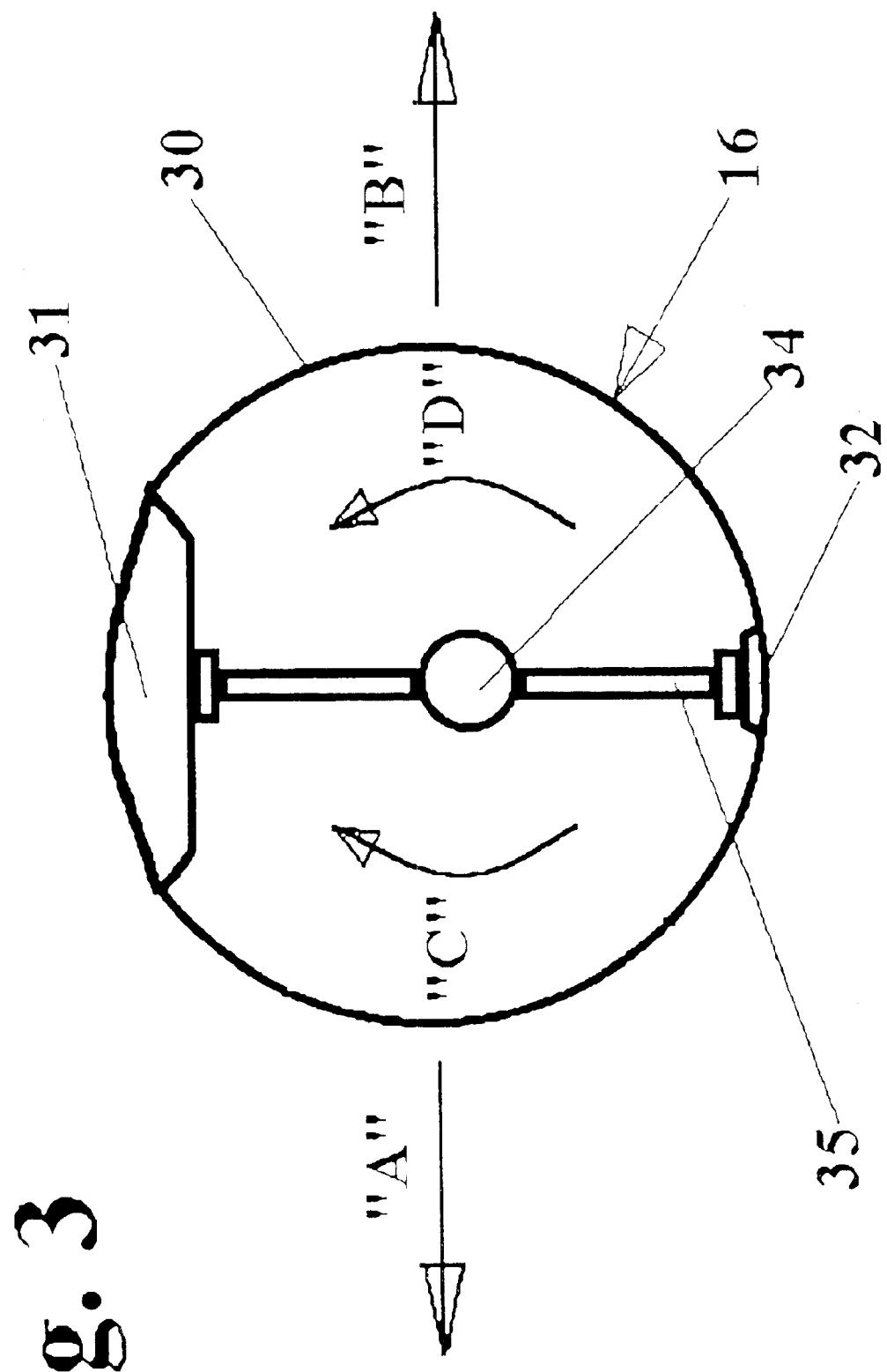
FIG. 3 is a perspective view, slightly from above and on an enlarged scale, of a distributor.
Figure 4:
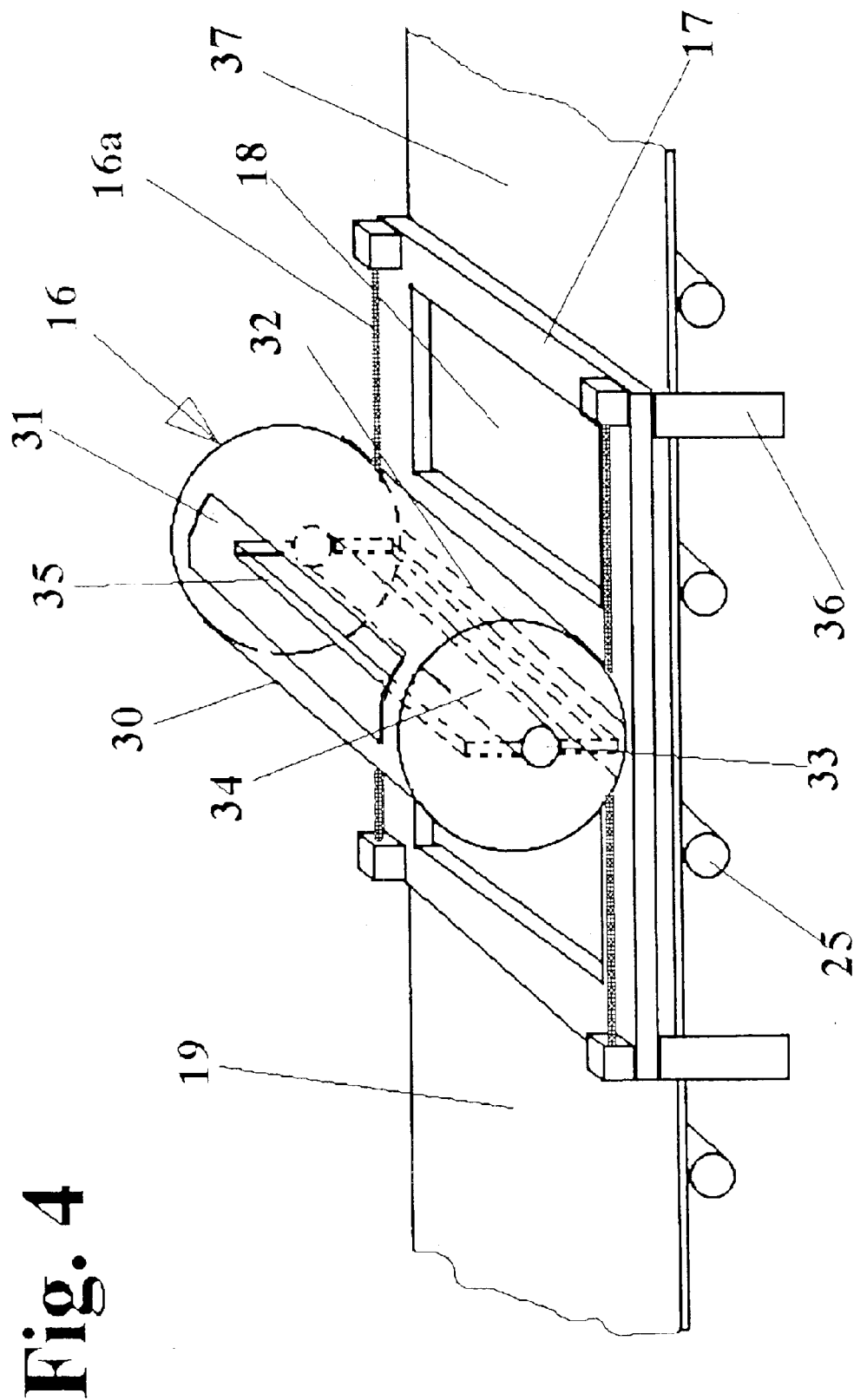
FIG. 4 shows a front view of the distributor in FIG. 3.

As can be seen in FIGS. 3 and 4, the distributor 16 comprises a container 30, preferably having a cylindrical configuration, with a longitudinal loading opening 31, proximal during use to the opening 26 of the hopper 15, and a longitudinal discharge slot 32 on the opposite side, means of support 33 for a shaft 34, positioned axially inside the container 30, designed to support and drive a pair of blades 35. The shaft 34 is kinematically connected to any appropriate source of motion and its rotation axis, albeit preferably parallel to that of the container 30, is advantageously offset towards the longitudinal slot 32.

The distributor 16 is equipped with a movement device, for example a rack guide 16a, connected to a source of motion, designed to move it over the platform 17 maintaining the slot adjacent to the platform 17 supported by uprights 36.

In this way, the alternating movements of the distributor 16 according to the directions indicated by the arrows marked "A" and "B", alternately move the slot 32 above one or other of the hollow moulds 18 depositing therein the crushed and rolled material 24.

The movements of the distributor 16 in the directions indicated by the arrows "A" and "B" correspond respectively to the rotations of the blades 35 in the directions indicated respectively with "C" and "D".

The material 24 is thus distributed uniformly, homogeneously and rapidly into the moulds 18, and the rolling carried out by the presser cylinders 14 ensures that no high granulometry intrusions are present which could cause holes or distortions in the finished product.

According to a variation not shown in the drawings, the distributor 16 can be fixed while the platform 17 can be kinematically connected to a source of motion designed to move it with respect to the distributor 16.

The second conveyor belt 19, which usually has a paper covering 37 attached to it, is positioned immediately below the platform 17 at a distance which is strictly related to the thickness of the sheet 11.

Following the rolling and the uniform distribution of the material 24 inside the moulds, this thickness is particularly reduced.

The sheet 11 is then carried, by the second conveyor 19, towards the compression and compacting device 20, which can be a vibration compressor able to exercise a pressure equal for example to 32000 kg/cm², and then to the furnace 21 for hardening.

Exit from the furnace 21 is followed by the usual finishing operations of cutting to size, chamfering, calibration and reaming, concluding with discharge of the finished product.

The presser cylinders 14 can, for example, present a diameter of 300 millimeters and be surface treated by means of chromium plating.

The distributor 16 can present a diameter of 900 millimetres with a misalignment of the shaft 34 equal to 20 millimeters. The width of the longitudinal loading opening 31 of the distributor 16 can be 400 millimeters while the width of the longitudinal discharge slot 32 is for example 90 millimeters.

The plant 10 can be equipped with sensors and/or transducers connected to an electronic control unit designed to manage the production cycle on a continuous basis.

The procedure for the production of sheets or panels 11 using the plant 10 according to the invention comprises:

a first stage in which the various materials making up the agglomerate are crushed;

a second stage in which the crushed material 24 are mixed, in order to obtain as homogeneous a product as possible, during which the resin binders are added;

a third stage in which the crushed and rolled material 24 is loaded in the distribution hopper 15;

a fourth stage in which the crushed and rolled material 24 is discharged from the hopper 15 and fed into the distributor or spreader 16;

a fifth stage in which the distributor 16 moves backwards and forwards over the moulds 18 of the platform 17 with simultaneous alternating mixing of the material 24 contained in the distributor 16, said mixing being in the opposite direction with respect to the movement of the distributor;

a sixth stage in which the material 24 is discharged from the distributor 16 into the moulds 18 on the platform 17, designed to give the agglomerate material 24 a well-defined configuration;

a seventh stage in which the configured agglomerate material 11 is pressed and compacted;

an eighth stage in which the panel 11 is hardened at a predetermined temperature;

The rotary mixing of the crushed agglomerate material 24 inside the distributor 16 takes place by moving this material 24 mostly in correspondence with the discharge slot 26 of the said distributor.

Figure 5:
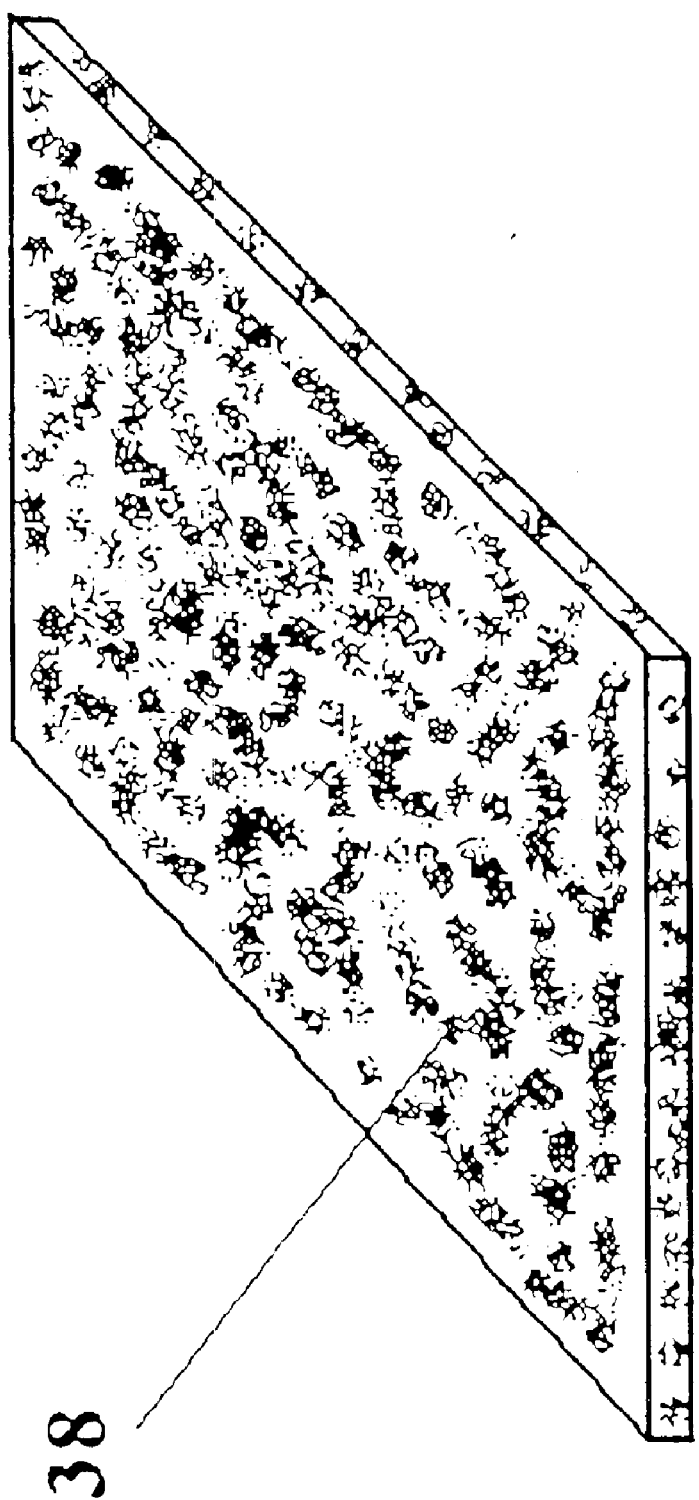
FIG. 5 is a perspective view, slightly from above and on an enlarged scale, of a panel according to the invention.

With reference to FIG. 5, it can be seen that the finished product 38 consists of a sheet or panel of agglomerate material with extremely limited thicknesses, preferably between 4 and 8 mm, a high degree of flexibility and good mechanical characteristics.

The dimensions of the sheet 38 can be such as to present a surface of several square metres without this implying particular problems of cracking or breaking during its placing in position.

What is claimed is:

1. A plant (10) for the production of sheets or panels (38) of agglomerate material with improved flexibility and limited thickness comprising:

a mixer crusher (12) designated to accept raw stone material and other agglomerate components in order to reduce them to a fine degree of granulometry, subsequently discharging hem onto a first conveyor belt (13);

a hopper (15) designated to accept the crushed and rolled material (24) and to transfer it to a distributor or spreader (16) positioned below the hopper, said spreader (16) comprising a substantially cylindrical container (30) with a loading opening (31), adjacent, in use, to said hopper (15) and comprising a discharge slot (32) on the opposite side to said opening (31), and a mixing device of the agglomerate material (24) inside said container (30);

a platform (17), positioned below said spreader (16), fitted with special moulds (18) with no bottom, designed to receive said material (24) discharged from said spreader (16);

a second conveyor belt (19), immediately below said platform (17), on which the material (24) is received from said moulds (18) and conveyed towards as compression and compacting device (20);

a furnace (21), designed to harden said previously compressed and compacted material is conveyed;

machine tools for finishing operations such as smoothing, polishing, cutting to size, chamferring, calibrating and reaming characterized in that it also comprises a series of presser cylinders (14) designed to level and roll said crushed material 924), and in that said mixing device comprises a pair of blades (35) fixed to a shaft (34) rotating around an axis not corresponding to that of said container (30) and in particular offset towards said slot (32), so that during their rotation the blades skim said slot.

2. A plant (1) according to claim 1, characterized in that it also comprises a device for the relative movement of said container (30) with respect to said platform (17), and a kinematic connection to a source of motion for said mixing device and said movement device.

3. A plant (10) according to claim 1, characterized in that said device for the relative movement of said container (3) with respect to said platform (17) consists of rack guides (16a).

4. A plant (10) according claim 1, characterized in that said series of presser cylinders (14) presents an adjustable air gap for the passage of said crushed material 924) so that it can be rolled.

5. A plant (10) according to claim 1, characterized in that between said first conveyor (13) and said second conveyor (19) is an upstream of which said loading hopper (15) for said distributor (16) is positioned while downstream of said intermediate conveyor (27) is an accumulation tank for said crushed material (24) coming from said first conveyor (13).

6. A plant (10) according to claim 1, characterized in that it presents sensors and/or transducers connected to an electronic control unit designated to manage the production cycle on a continuous basis.

7. Procedure for the production of sheets or panels (38) of agglomerate material with improved flexibility and limited thickness, comprising the following working stages:

a first stage in which the various materials making up the agglomerate are crushed;

a second stage in which the crushed material 924) is mixed, in order to obtain as homogenous a product as possible, during which the resin binders are added;

a third stage in which said crushed and rolled material 924) is loaded in a distribution hopper (15);

a fourth stage in which the crushed and rolled material (24) is discharged from the hopper (15) and fed into a distributor or spreader (16);

a fifth stage in which said distributor (16) moves backwards and forwards over moulds (18) with simultaneous alternating mixing of the material contained in said distributor (16), said mixing being in the opposite direction with respect to said relative movement;

a sixth stage in which said material (24) is discharged from the distributor (16), said mixing being in the opposite direction with respect to said relative movement;

a sixth stage in which said material (24) is discharged from the distributor 16) into said moulds (18), in order to give the agglomerate material (24) a well-defined configuration;

a seventh stage in which said configured agglomerate material 911) is pressed and compacted;

an eighth stage in which the panel (11) is hardened at a predetermined temperature;

characterized in that between said second and third stages said crushed material is subject to leveling and rolling by a series of rollers, and in that said rotary mixing of the crushed agglomerate material 924) inside said distributor (16) takes place by moving this material (24) in correspondence of the discharge of said distributor (16), so that the material is distributed in the moulds homogeneously and uniformly.

8. Procedure according to claim 7, characterized in that during said fourth stage of discharge form the hopper to the distributor (16) a quantity of material is discharged into the distributor equal to the quantity which must be subsequently placed in the moulds.

9. Sheet or panel (38) of agglomerate material consisting of a quartz and/or sand and/or resin binders and/or granite-based mixture, which may also comprise intrusions of various kinds, such as metallic elements, mother-of-pearl, precious stones, glass, wood, ceramics, characterized in that it has a thickness of about 6 mm (0.236 inches).

10. Sheet or panel according to claim 8, characterized in that the thickness of said sheet or panel (38) ranges between 4 and 8 mm.

11. Sheet or panel according to claim 9, characterized in that it has a thickness of about 6 mm.

12. A plant (10) according to claim 2, characterized in that said device for the relative movement of said container (3) with respect to said platform (17) consists of rack guides (16a).

13. A plant (10) according to claim 2, characterized in that said series of presser cylinders (14) presents an adjustable air gap for the passage of said crushed material 924) so that it can be rolled.

14. A plant (10) according to claim 2, characterized in that between said first conveyor (13) and said second conveyor (19) is an upstream of which said loading hopper (15) for said distributor (16) is positioned while downstream of said intermediate conveyor (27) is an accumulation tank for said crushed material (24) coming from said first conveyor (13).

15. A plant (10) according claim 2, characterized in that it presents sensors and/or transducers connected to an electronic control unit designated to manage the production cycle on a continuous basis.

16. Sheet or panel according to claim 10, characterized in that it has a thickness of about 6 mm.

* * * * *